United States Patent
Walbran et al.

(10) Patent No.: US 10,839,413 B2
(45) Date of Patent: *Nov. 17, 2020

(54) CUSTOMER LOYALTY TIERS WITH REDUCED LATENCY STATE UPDATES

(71) Applicant: GOOGLE LLC, Mountain View, CA (US)

(72) Inventors: Andrew David Walbran, London (GB); Kenneth Paul Stoltz, London (GB); David Singleton, London (GB); Douglas Alexander Gresham, London (GB)

(73) Assignee: Google LLC, Mountain View, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/904,312

(22) Filed: Feb. 24, 2018

(65) Prior Publication Data

US 2018/0181982 A1  Jun. 28, 2018

Related U.S. Application Data

(63) Continuation of application No. 13/436,925, filed on Mar. 31, 2012, now Pat. No. 9,911,133.

(51) Int. Cl.
*G06Q 30/00* (2012.01)
*G06Q 30/02* (2012.01)

(52) U.S. Cl.
CPC ......... *G06Q 30/0226* (2013.01); *G06Q 30/02* (2013.01); *G06Q 30/0239* (2013.01)

(58) Field of Classification Search
CPC . G06Q 30/0226; G06Q 30/02; G06Q 30/0239

(Continued)

(56) References Cited

U.S. PATENT DOCUMENTS 8,145,536 B1 * 3/2012 Goel .................. G06Q 10/02
                                                   705/26.1
9,204,257 B1   12/2015 Mendelson
(Continued)

FOREIGN PATENT DOCUMENTS

JP   2001-338199 A     12/2001
JP   2001338199  A  *  12/2001   ............ G06F 17/60
(Continued)

OTHER PUBLICATIONS

• Oracle. (2013). Entering Loyalty Members' Transactions. Retrieved online Oct. 19, 2017. https://docs.oracle.com/cd/E14004_01/books/LoyaltyAdmin/LoyaltyAdmin_HostUse18.html (Year: 2013).*

(Continued)

*Primary Examiner* — James A Reagan
(74) *Attorney, Agent, or Firm* — Dority & Manning, P.A.

(57) ABSTRACT

Systems and methods are described herein for supporting loyalty tiers. According to certain aspects, a custom number of loyalty tiers may be specified. Dynamic tier boundaries may be defined for each tier based upon a specified number of loyalty points, a percentile of total loyalty points, or a combination thereof. Periodic recomputing of tier boundary values can support dynamic loyalty tiers. According to certain other aspects, a user loyalty status may include a current tier and a pending tier. User loyalty points may be updated for a current loyalty activity. The updated user loyalty points may be compared with a point boundary for the pending tier and the user may be updated to the pending tier. Transacting the tier update with the server may be bypassed to reduce tier update latency. Also, immediate access at the client to features associated with the updated current tier may be supported.

20 Claims, 4 Drawing Sheets

(58) Field of Classification Search
USPC .......................................... 705/50–79, 14.27
See application file for complete search history.

(56) References Cited

U.S. PATENT DOCUMENTS

| | | | | |
|---|---|---|---|---|
| 9,911,133 | B1* | 3/2018 | Walbran | G06Q 30/0226 |
| 2007/0239521 | A1* | 10/2007 | Khadpe | G06Q 30/02 |
| | | | | 715/764 |
| 2009/0055271 | A1* | 2/2009 | Drefs | G06Q 30/0226 |
| | | | | 705/14.27 |
| 2009/0069076 | A1* | 3/2009 | Silvestro | G07F 17/3232 |
| | | | | 463/25 |
| 2011/0161130 | A1 | 6/2011 | Whalin et al. | |
| 2011/0270664 | A1* | 11/2011 | Jones | G06Q 30/02 |
| | | | | 705/14.33 |
| 2011/0320246 | A1 | 12/2011 | Tietzen et al. | |
| 2012/0101881 | A1 | 4/2012 | Taylor et al. | |
| 2013/0304578 | A1 | 11/2013 | Kannan et al. | |
| 2015/0039413 | A1 | 2/2015 | Winkler | |

FOREIGN PATENT DOCUMENTS

| | | | | |
|---|---|---|---|---|
| WO | WO-2010007167 | A2* | 1/2010 | ......... G06Q 30/0222 |
| WO | WO-2010106554 | A2* | 9/2010 | ............ G06Q 30/02 |

OTHER PUBLICATIONS

Oracle. Entering Loyalty Members' Transactions. (2013). Retrieved online Jul. 4, 2020. https://docs.oracle.com/cd/E14004_01/books/LoyaltyAdmin/LoyaltyAdmin_HostUse18.html (Year: 2013).*

Kopalle et al. A Dynamic Structural Model of the Impact of Loyalty Programs on Customer Behavior. (Feb. 1, 2007). Retrieved online Jul. 4, 2020. https://pdfs.semanticscholar.org/4408/a6a456d2bef69f71d6787fa2c785254c8e81.pdf (Year: 2007).*

• Oracle. Ensuring Customer Loyalty: Designing Next-Generation Loyalty Programs. (Feb. 2005). Retrieved online Jul. 4, 2020. http://www.oracle.com/us/products/applications/siebel/047108.pdf (Year: 2005).*

Biehn, "U.S. Office Action issued in copending U.S. Appl. No. 13/436,929, filed Mar. 31, 2012", dated Jul. 8, 2015, 5 pages.

Biehn, "U.S. Office Action issued in copending U.S. Appl. No. 13/436,929, filed Mar. 31, 2012", dated Dec. 29, 2015, 7 pages.

Dasgupta, "Office Action issued in Australian Application No. 2013207647", dated May 19, 2014, 3 pages.

Dasgupta, "Office Action issued in Australian Application No. 2013207647", dated Oct. 4, 2013, 3 pages.

Schmucker "U.S. Office Action issued in copending U.S. Appl. No. 13/941,415, filed Jul. 12, 2013", dated Mar. 29, 2018, 30 pages.

Kim, "International Search Report and Written Opinion issued in International Application No. PCT/US2013/048991", dated Oct. 16, 2013, 12 pages.

Oracle, "Entering Loyalty Members Transactions", Bookshelf v8.1/8.2, Oracle 2013, Retrieved online Oct. 19, 2017, 2 pages.

Reagan, "U.S. Office Action issued in copending U.S. Appl. No. 13/436,925, filed Mar. 31, 2012", dated Sep. 1, 2016, 20 pages.

Reagan, "U.S. Office Action issued in copending U.S. Appl. No. 13/436,925, filed Mar. 31, 2012", dated Feb. 2, 2017, 23 pages.

Schmucker, "U.S. Office Action issued in copending U.S. Appl. No. 13/941,415, filed Jul. 12, 2013", dated Oct. 25, 2016, 22 pages.

Schmucker, "U.S. Office Action issued in copending U.S. Appl. No. 13/941,415, filed Jul. 12, 2013", dated Jul. 27, 2016, 23 pages.

Schmucker, "U.S. Office Action issued in copending U.S. Appl. No. 13/941,415, filed Jul. 12, 2013", dated Aug. 7, 2017, 29 pages.

Unknown, "My Starbucks Rewards", Nov. 30, 2010, http://web.archive.org/web/201 01130202420/https://www.starbucks.com/card/rewards, 11 pages.

West, "U.S. Office Action issued in copending U.S. Appl. No. 13/436,925, filed Mar. 31, 2012", dated Jun. 17, 2013, 11 pages.

West, "U.S. Office Action issued in copending U.S. Appl. No. 13/436,925, filed Mar. 31, 2012", dated Feb. 25, 2013, 9 pages.

West, "U.S. Office Action issued in copending U.S. Appl. No. 13/436,929, filed Mar. 31, 2012", dated Jul. 10, 2013, 8 pages.

Schmucker, "U.S. Office Action issued in copending U.S. Appl. No. 13/941,415, filed Jul. 12, 2013", dated Oct. 9, 2018.

U.S. Appl. No. 16/244,073 to Niket Desai filed Jan. 9, 2019 (GOOG-2084-1).

U.S. Appl. No. 13/436,925 to Walbran et al. filed Mar. 31, 2012 (GOOG-0365).

U.S. Appl. No. 13/436,929 to Singleton et al. filed Mar. 31, 2012 (GOOG-0370).

U.S. Appl. No. 13/941,415 to Niket Desai filed Jul. 12, 2013 (GOOG-2084).

* cited by examiner

_US 10,839,413 B2_

CUSTOMER LOYALTY TIERS WITH REDUCED LATENCY STATE UPDATES

CROSS REFERENCE TO RELATED APPLICATIONS

This application is a continuation of U.S. patent application Ser. No. 13/436,925, filed Mar. 31, 2012 and entitled "Customer Loyalty Tiers With Reduced Latency State Updates." The entire contents of the above-identified priority application are hereby fully incorporated herein by reference.

TECHNICAL FIELD

The present disclosure relates to systems and methods for enabling customer loyalty categories or tiers for customer loyalty programs provided by merchants to reward customer loyalty activities.

BACKGROUND

Certain customer loyalty systems allow users to check in at a physical merchant location to receive loyalty credit for visiting the business. These loyalty credits may be used to reward customers who frequently visit the merchant with special offers, discounts, or other benefits. Merchants may desire to categorize customers according to how often they visit the merchant location to customize rewards for customer loyalty.

Traditionally, merchants do not have a generalized framework to define various loyalty categories for their customer rewards. Furthermore, a need exists to address how a number of check-in events or other actions corresponding to a loyalty reward system may vary significantly between merchants or types of merchants. For example, a coffee shop may expect loyalty customers to visit several times a week while customers may visit a hotel less frequently.

Another deficiency in technology related to customer loyalty programs relates to latency in any system for tracking customer loyalty. Such latency would become particularly relevant if the customer loyalty categories are also involved. For example, a user currently checking in to a merchant location may now be eligible for a loyalty category upgrade thanks to loyalty recognition gained during the current visit. The present check-in and related upgrade traditionally takes some amount of time to process and track. This time delay, or latency, can prevent the recognition or application of the new upgraded loyalty category on the same visit thereby frustrating the customer instead of rewarding their loyalty as initially desired.

SUMMARY

In certain exemplary aspects described herein, methods and systems can support the management of customer loyalty tiers. According to certain aspects disclosed herein, setting a custom number of loyalty tiers is supported along with branding of the tiers with custom names, icons, or other descriptors. Dynamic tier boundaries may be defined for each tier based upon an absolute number of loyalty points, a percentile of total loyalty points, or a combination thereof. Periodic recomputing of tier boundary values can support the dynamic definition of loyalty tiers wherein customers may be assigned to loyalty tiers according to their earned loyalty points.

According to certain other aspects disclosed herein, a user loyalty status may be received at a client from a server where the loyalty status comprises a current tier and a pending tier. A user loyalty point count may be updated at the client in response to a current loyalty activity. The updated user loyalty point count may be compared at the client with a point boundary associated with the pending tier, and the current tier may be updated to the pending tier at the client in response to the updated user loyalty point count falling within the point boundary associated with the pending tier. During the tier update, transacting the tier update with the server may be bypassed to reduce tier update latency. Instead, immediate access at the client to features associated with the updated current tier may be supported.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

The methods and systems described herein enable customer loyalty technology for awarding customer users for various activities related to merchants. Loyalty points may be awarded for each visit to a merchant location or for other activity. For example, checking in at a location may earn the customer user one value of points while writing a review, inviting friends, or posting a related photo online may earn various other values of points.

Merchant users may define tiers for customer loyalty points. The assignment of a customer user into a certain tier may be referred to as the customer's loyalty tier status or loyalty status for that merchant. The merchant user may set a minimum number of points required for a customer user to reach a certain loyalty tier. Similarly, the merchant user may specify a certain minimum percentile for a customer to reach a particular tier. For example, the merchant might specify a silver loyalty tier requiring the customer to be in at least the 50th percentile of points and a gold loyalty tier requiring that the user be in at least the 95th percentile for points. A combination of points and percentile may also be used to define the requirements to enter a loyalty tier. For example, a gold loyalty tier may require at least 100 points and for the user to be in at least the 95th percentile.

A customer user can use a mobile device such as a smartphone to check in at a merchant location. A server associated with the loyalty system may receive the check-in and retrieve the customer's loyalty tier status for that merchant. The server can provide the loyalty tier status to the mobile device associated with the user. In addition to sending the single loyalty tier, the server may also provide one or more pending tiers. These pending tiers may relate to pending upgrades or downgrades of the customer's loyalty tier. One of the pending tiers may be achieved by a current action of the customer user such as their current check-in event. Having information on these pending upgrade tiers or downgrade tiers at the customer's mobile device can allow the customer access to newly achieved loyalty tiers immediately, or almost immediately. This reduced latency of tier status updates can provide an improved user experience compared to waiting for points from the current check-in event to propagate through various networks and systems before returning an upgraded loyalty tier to the customer.

The functionality of the exemplary embodiments will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

Figure 1:
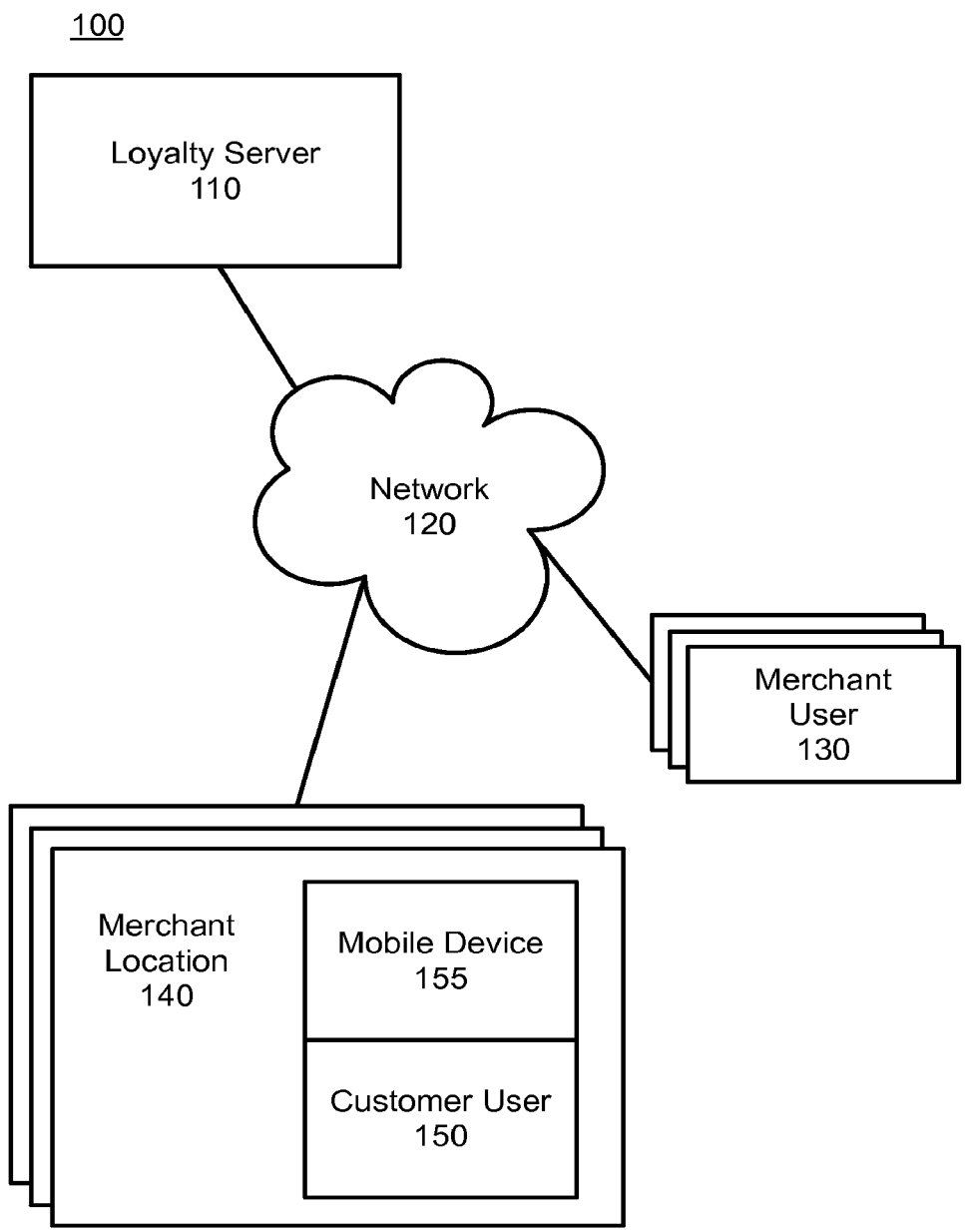
FIG. 1 depicts an operating environment for a customer loyalty system, in accordance with certain exemplary embodiments.

FIG. 1 depicts an operating environment 100 for a customer loyalty system, in accordance with certain exemplary embodiments. As depicted in FIG. 1, the operating environment 100 includes a loyalty server 110 for implementing customer loyalty programs involving at least two types of users. These users may include merchant users 130 and customer users 150. The customer users 150 may be customers of the merchant. A merchant user 130 can associate one or more customer loyalty program with a merchant location 140. A customer user 150 can participate in one or more customer loyalty programs. One example of participation can include the user checking into the merchant location 140 using a mobile device 155. The mobile device 155 can communicate over a network 120 with the loyalty server 110 to participate in the customer loyalty program. The merchant user 130 may also communicate with the loyalty server 110 over a network that is the same or similar to network 120.

The merchant user 130 may be associated with the merchant. For example, the merchant user 130 may be an employee, agent, owner, or other representative of the merchant. The merchant user 130 may interact with the customer loyalty systems described herein to establish, update, and maintain loyalty systems for rewarding activities of customers that support the merchant in some direct or indirect fashion. These activities may include visiting a merchant location 140, transacting business with the merchant, sharing reviews of the merchant, or referring others to the merchant. The customer loyalty activities may be rewarded for achieving a certain frequency or activities. For example, a customer may be specially rewarded for visiting a coffee shop three times in one week or for staying at a hotel three times in one year. Loyalty activities may include making reference to the merchant in any medium such as online reviews, social networks, status streaming services, photo sharing archives, interest sharing archives, videos, and so forth.

The customer user 150 may be any customer, client, member, fan, beneficiary, supporter, or user of goods or services provided by the merchant. The customer user 150 may wish to participate in loyalty programs with the merchant in order to earn special rewards or standing. These rewards may include coupons, special pricing, special access, special events, perks, promotional items, birthday recognition, other related benefits, and so forth. The merchant may make these various benefits or rewards available to customer users 150 based on a loyalty point system.

The merchant location 140 is generally a physical or geographical location associated with the merchant. The merchant location 140 may also be a virtual location, a set of locations, a classification of locations, or so forth. The merchant location 140 may also be understood with respect to temporal, or time based, boundaries in addition to, or instead of, physical or geographical locations. For example, a merchant location 140 may generally involve showing up at a store and checking-in as a customer. The merchant location 140 may alternatively be defined as checking-in during a certain event, sale, weekend, meal time, etc. It should be understood that the merchant location 140 may be a set of locations such as any franchise location associated with a particular merchant or organization. Thus, a merchant may be associated with more than one physical location and may define each as its own merchant location 140 or treat them collectively as a single location for the sake of loyalty programs.

A mobile device 155 may be used by a customer user 150 to check-in or perform some other loyalty activity while they are present at the merchant location 140. It should be appreciated that the mobile device 155 may be used for such activities while located elsewhere from a merchant location 140. Customer users 150 may employ devices other than the mobile device 155, such as home computers or other computerized systems, for loyalty activities. The mobile device 155 or other related systems or devices may be mobile phones, smart phones, PDAs, netbook computers, laptop computers, tablet computers, or any other wired or wireless, processor-driven devices.

The mobile device 155 may execute computer-readable program code, implement hardware-based instructions, or any combination thereof to support the customer loyalty technology discussed herein. These software and/or hardware components may be referred to as modules. The modules associated with the mobile device 155 may be referred to as client modules or client-side modules.

The network 120 can support communications between the mobile device 155, the customer users 150, the merchant users 130, and the loyalty server 110. The network 120 may be a single network, various separate networks, or two or more interconnected networks. The network 120 may be a wired, wireless, optical, radio frequency, mobile, cellular, any other data or voice network, or any combination thereof. For example, the network 120 may be an Internet or the Internet, a local area network, access network, metro area network, wide area network, or any combination thereof. All or part of the network 120 may be a 3G or 4G mobile communication network, any other mobile network, or any wireless access network.

The loyalty server 110 can be any processor-based or other type of computer system for supporting the loyalty systems discussed herein. The loyalty server can support receiving check-ins or other loyalty activity events from customer users 150 or their mobile devices 155. The loyalty server 110 can support interfacing with the merchant users 130 to establish and maintain customer loyalty programs, loyalty tiers, and loyalty tier upgrade and downgrade latency reduction. The functions of the loyalty server 110 may be separated over various computer systems for the purposes of load balancing, redundancy, functional diversity, or otherwise. Aspects of the loyalty server 110 may included database servers, data communication equipment, data storage systems, and so forth. The loyalty server 110 or other associated servers may also support mobile mapping services relating to check-ins at merchant locations 140. The loyalty server 110 or other associated servers may also support activity tracking or activity stream systems for processing activities of users such as customer users 150.

It should be appreciated that the loyalty server 110 may process check-ins as well as various other loyalty signals such as participation in events, social media, postings, tweeting, status updates, photos, videos, suggestions, referrals, transactions, purchases, and so forth. These and other aspects of the loyalty server 110 are discussed in further detail below.

The loyalty server 110 may execute computer-readable program code, implement hardware-based instructions, or any combination thereof to support the customer loyalty technology discussed herein. These software and/or hardware components may be referred to as modules. The modules associated with the loyalty server 110 may be referred to as server modules or server-side modules.

Figure 2:
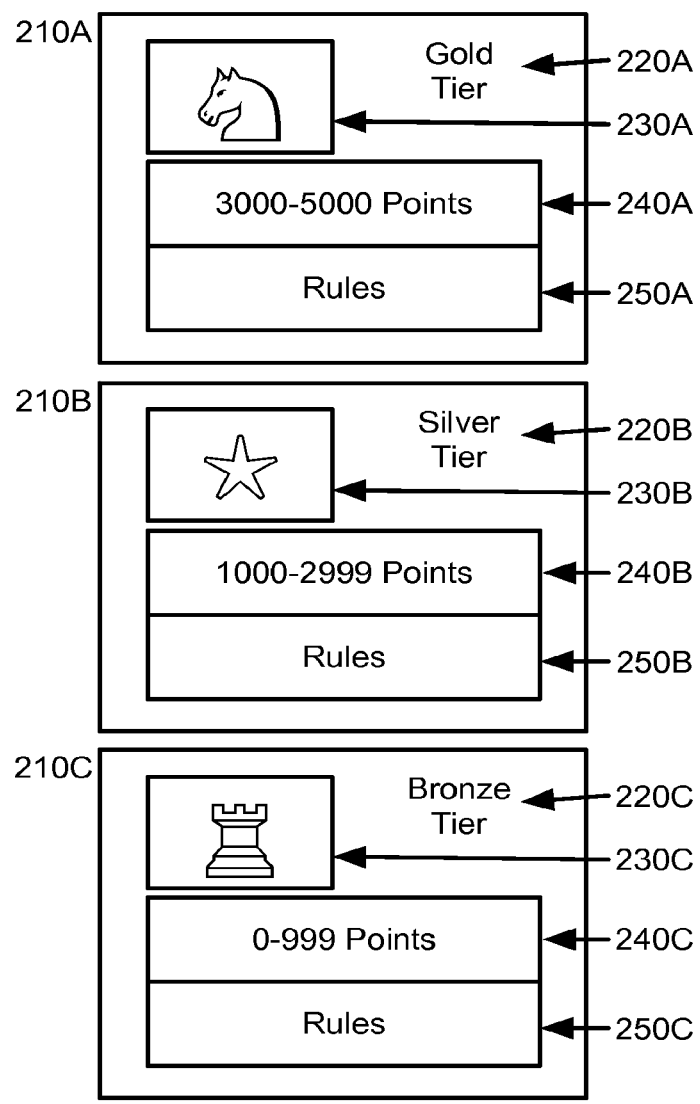
FIG. 2 depicts a set of tiers for categorizing customer loyalty, in accordance with certain exemplary embodiments.

FIG. 2 depicts a set of tiers for categorizing customer loyalty in accordance with certain exemplary embodiments. As depicted in FIG. 2, one example embodiment involves a user loyalty system having three tiers including a first tier 210A, a second tier 210B, and a third tier 210C. Tiers 210A-210C may be referred to generally or collectively as tiers 210. The tiers 210 may also be referred to as levels, groups, or categories. While this example includes three tiers 210, it should be appreciated that a user loyalty system may be defined to include any number of tiers 210.

In the illustrated example, the first tier 210A has the label 220A "gold tier," the second tier 210B has the label 220B "silver tier," and the third tier 210C has the label 220C "bronze tier." These labels 220A-220C may be referred to generally or collectively as tier labels 220. Similarly, the example shows the first tier 210A with icon 230A, the second tier 210B with the icon 230B, and the third tier 210C with the icon 230C. The icons 230A-C may be referred to generally or collectively as tier icons 230. The tier icons 230 may also be images, photos, symbols, text, video clips, audio clips, animations, or any other media or content associated with the respective tiers 210.

In the illustrated example, the first tier 210A has a first point range 240A of 3000-5000 points, the second tier 210B has a second point range 240B of 1000-2999 points, and the third tier 210C has a third point range 240C of 0-999 points. These point ranges 240A-240C may be referred to generally or collectively as tier point ranges 240. The tier point ranges 240 serve to define the tiers 210 and how customer users 150 are allocated into the tiers 210 according to their respective earned points for loyalty activities.

In the illustrated example, the first tier 210A may have a first set of tier rules 250A, the second tier 210B may have a second set of tier rules 250B, and the third tier 210C may have a third set of tier rules 250C. These tier rules 250A-250C may be referred to generally or collectively as tier rules 250. The tier rules 250 may be used to define the allocation of customer users 150 to tiers according to their loyalty events, time, actions of other customer users, and various other parameters. The tier rules 250 may include rules such as automatically upgrading the tier 210 of customer user 150 after a certain number of check-ins or other loyalty events. Another example tier rule 250 may involve allowing a customer user 150 to remain in a tier 210 for a minimum amount of time or number of loyalty events even though their points indicate that they should be downgraded.

Yet another example tier rule 250 may involve providing a lowest tier that is upgraded from at the very first loyalty event for a given customer user 150. Such a tier 210 may be designated as initial, provisional, or "everyone" and may apply to customer users 150 who have never checked in or performed any other loyalty activity. It should be appreciated that tier rules 250 may be defined by the merchant user 130 according to various parameters including time, loyalty points, loyalty event counts, loyalty event categories, tiers 210, merchant locations 140, any other user or merchant parameters, or any combinations thereof.

System Process

Figure 3:
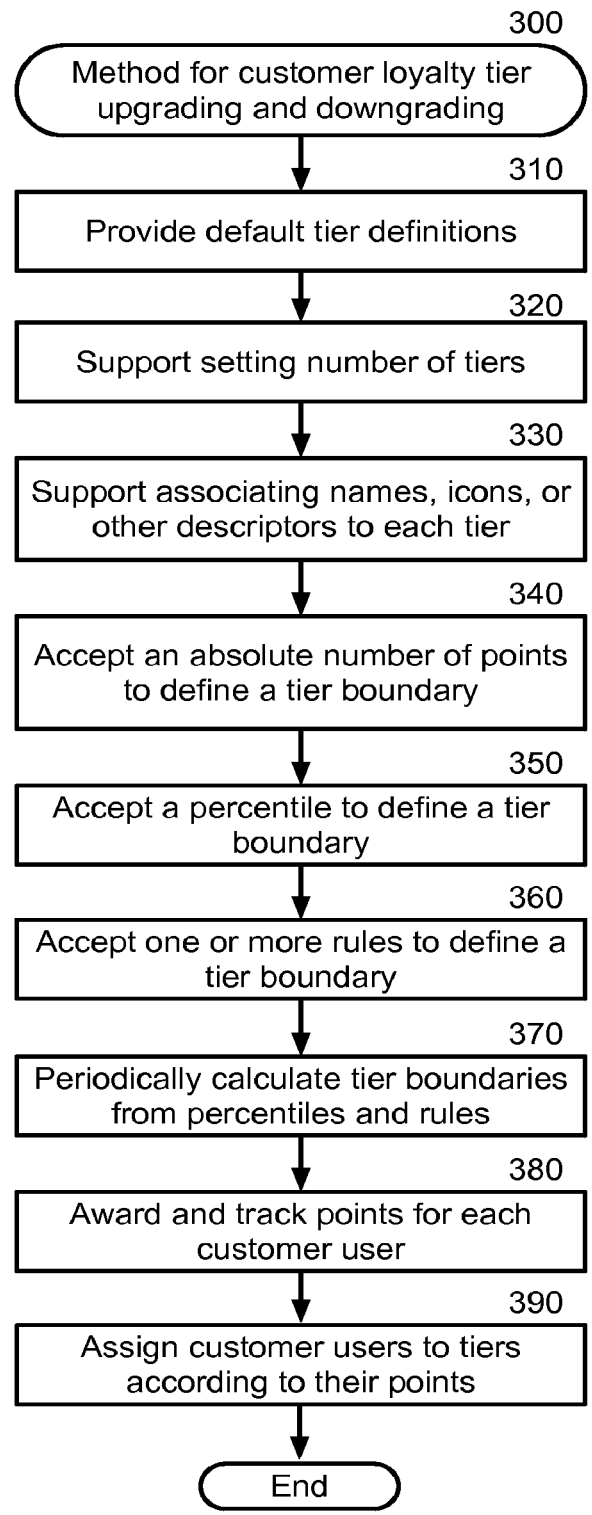
FIG. 3 is a block flow diagram depicting a method for customer loyalty tier upgrades and downgrades, in accordance with certain exemplary embodiments.

FIG. 3 is a block flow diagram depicting a method 300 for customer loyalty tier upgrades and downgrades, in accordance with certain exemplary embodiments. The method 300 is described with reference to the components and concepts discussed with respect to FIGS. 1 and 2.

In block 310, the loyalty server 110 can provide default definitions for tiers 210. For example, a default set of "gold," "silver," and "bronze" level tiers 210 may be put into place for a new merchant user 130. It should be appreciated that the number of default tiers 210 may be other numbers that the example of three. Similarly, the tier labels 220, and other tier properties used as the default settings may be any specified values and may be set as part of a configuration of the loyalty server 110.

In block 320, the loyalty server 110 can support the setting of the number of loyalty tiers 210 by the merchant user 130. The merchant user 130 can define or alter the number of tiers 210 to whatever number best suits the merchant's loyalty reward program. The number of tiers 210 can also include special tiers such as the initial or introductory tier for customer users 150 who have not checked in yet.

In block 330, the loyalty server 110 can support associating tier labels 220, tier icons 230, or other descriptors to each loyalty tier 210. The merchant user 130 can supply these definitions to brand their loyalty programs as they wish with custom names, images, tiers levels and so forth. Merchant users 120 may also choose whether to have one set of loyalty program definitions for all of their merchant locations 140 or to have a different programs for each location, subsidiary, or other subdivision.

In block 340, the loyalty server 110 can accept an absolute number of loyalty points to define the boundary of a tier 210. The merchant user 130 can set the boundaries between tiers 210 as a specified number of loyalty points. The upper and lower boundaries of a tier define that tier's point range 240. The merchant user 130 can set the numbers to be flexible according to their loyalty program. The merchant user 130 may also specify how many loyalty points are earned for each loyalty event or type of loyalty event. Adjusting these tier point ranges 240 allows the merchant user 130 to set or manage the distribution of customer users 150 at each loyalty tier 210.

In block 350, the loyalty server 110 can accept a percentile to define the boundary of a tier 210. The merchant user 130 can establish custom percentile distributions of users amongst these tiers 210. For example, the top 10% of the users may be given the highest tier 210 by setting the lower boundary of that tier at the 90th percentile. Calculations over all users may be performed periodically to establish the actual point numbers corresponding to a given percentile boundary. From example, these calculations may occur nightly via a scheduled process or cron job. Other periodicities or load-based schedules for recalculation may be used. The calculations may be performed over all customer users 150 or a sampling of customer users 150.

In block 360, the loyalty server 110 can accept one or more tier rules 250 to define a boundary of a given tier 210. The tier rules 250 may be used to define the allocation of customer users 150 to tiers 210 according to their loyalty events, time, actions of other customer users, and various other parameters. The tier rules 250 may include rules such as automatically upgrading the tier 210 of customer user 150 after a certain number of check-ins or other loyalty events.

In block 370, the loyalty server 110 can periodically calculate tier boundaries from percentiles and rules. As discussed with respect to block 350, periodic recalculation of points based on percentiles can normalize boundaries of tiers 210 over all users. Point quantity boundaries for tiers 210 may be calculated according to the distribution of loyalty points of all users. This may be regularly recalculated as values change over time. A minimum number of points for each tier 210 may be determined according to the percentiles specified as discussed with respect to block 350. The tier boundary definitions may also involve combinations of fixed loyalty point boundaries and percentiles as discussed above. The boundaries may also start out as fixed loyalty point values prior to the loyalty server 110 collecting enough user information to calculate percentile-based boundaries.

In block 380, the loyalty server 110 can award and track points for each customer user 150 based on their loyalty events such as checking in at a merchant location 140. It should be appreciated that points may be defined to diminish or decay over time to reward frequent or continual loyalty to the merchant. The merchant user 130 may specify these parameters to the loyalty server 110.

In block 390, the loyalty server 110 can assign customer users 150 to loyalty tiers 210 according to the user's loyalty points, tier point ranges 240, and tier rules 250. Based on tier requirements and parameters set by the merchant user 130 into the loyalty server 110, each customer user 150 can be assigned to an appropriate loyalty tier 210 based on loyalty points and tier rules 250.

After block 390, the method 300 ends. Of course, additional loyalty tier systems may continue to be defined and supported according to the method 300.

Figure 4:
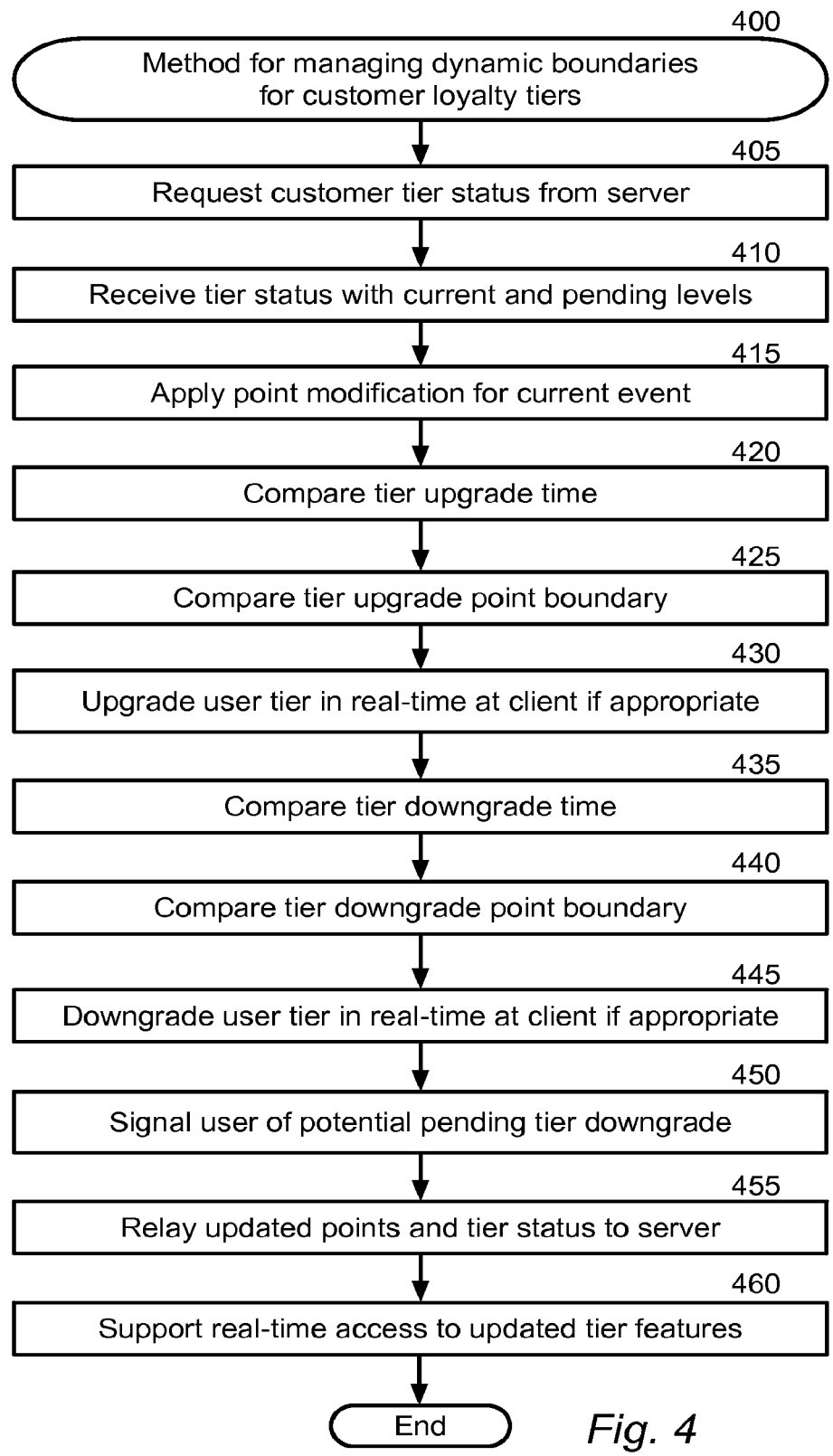
FIG. 4 is a block flow diagram depicting a method for managing dynamic boundaries for customer loyalty tiers, in accordance with certain exemplary embodiments.

FIG. 4 is a block flow diagram depicting a method 400 for managing dynamic boundaries for customer loyalty tiers 210 in accordance with certain exemplary embodiments. The method 400 is described with reference to the components and concepts discussed with respect to FIGS. 1 and 2.

In block 405, the mobile device 155 can request the loyalty tier status for the customer user 150 from the loyalty server 110. This request may be associated with the mobile device 155 detecting its proximity to the associated merchant location 140. The mobile device 155 may detect this proximity based upon global positioning satellite ("GPS") or wireless network assisted location. The mobile device 155 may also detect its proximity to a merchant location 140 based on an input from the customer user 150. This input may be associated with a check-in process or other loyalty activity or that merchant.

In block 410, the mobile device 155 can receive loyalty tier status for current tiers and well as for one or more pending tiers from the loyalty server 110. In addition to responding to the request discussed in block 405 with the current tier status of the user, the loyalty server 110 can also provide pending loyalty tiers. The pending tiers may be determined at the loyalty server 110 by pre-calculating potential updates to the loyalty points for the customer user 150. For example, the customer user 150 may be checking in at a merchant location 140 thereby earning some additional points that upgrade the customer user 150 to the next highest loyalty tier. Receiving the information about this potential pending tier update form the loyalty server 110 can save transactions for the mobile device 155.

According to one example, pending tier status could be pre-computed by setting the point triggers for tier boundaries lower by the number of points associated with a check-in or other type of present loyalty event. This modified boundary would indicate if a present point modification event (such as a check-in) would trigger a tier upgrade by exceeding the normal tier boundary. Similarly, tier boundaries may be stored in terms of a number of points needed for the upgrade tier to be set or pending. In such a model, each tier boundary can effectively be one check-in (or other event) less than the required number for the user to actually achieve the respective tier. According to another example, potential new points for the next check-in (or other event) may be added to a user's current loyalty status prior to comparing that status against the tier boundaries thus identifying any pending upgrades.

Tiers status information for customer users 150 may include associated timestamps. For example, the current tier may include a timestamp for when the customer user 150 earned the tier 210.

A pending upgrade tier may be provided when the customer user 150 is one check-in (or other loyalty event) away from gaining the new upgraded tier. The timestamp associated with this pending upgrade tier may be set to the earliest time that the customer user 150 may transition to the upgrade tier. Such timestamp checking may enforce restrictions. For example, the system may require that point earning check-ins must be more than a certain amount of time apart to count for loyalty scoring. In such an example, a customer user 150 with a pending upgrade tier along with timestamp that has been passed may transition to the upgrade tier as soon as their check-in (or other loyalty event) gives them the necessary points to upgrade. It should be appreciated that downgrades may be pending or occur from loyalty points expiring, being cashed in, or tier boundaries changing or being re-computed.

In block 415, loyalty point modifications for a current loyalty activity or event may be applied to the loyalty points for the customer user 150. For example, if the customer user 150 is checking in and a check-in is worth ten points, then the customer user's loyalty point count will be incremented by ten points. These point modifications may be performed for the customer user 150 at their mobile device 155.

In block 420, an upgrade time associated with the customer user's tier status or pending upgrade tier status may be compared at the mobile device 155. Loyalty points may expire after a certain amount of time. Furthermore, when several check-ins are made within a short period of time then only one of them may be counted for loyalty points. These time-dependent factors may be used to filter tier upgrades or pending tier upgrades.

In block 425, the loyalty tier upgrade point boundary for the customer user 150 may be compared with their current loyalty point count such as that determined in block 415. This comparison may take place at the mobile device 155.

In block 430, the customer user's loyalty tier 210 may be upgraded in real-time at the mobile device 155 appropriate. A client module or client software executing at the mobile device 155 may perform the tier upgrade in real-time, or in near real-time without first looping back to the loyalty server 110 based upon the pending upgrade tier previously supplied by the loyalty server 110. The tier upgrade may be considered appropriate if the point boundary discussed in block 425 is exceeded and conditions associated with the upgrade time discussed in block 420 are met.

In block 435, a downgrade time associated with the customer user's tier status or pending downgrade tier status may be compared at the mobile device 155. If the user has a pending downgrade tier set, the associated timestamp may be compared. If the timestamp has been exceeded, then transitioning to the pending downgrade tier may be processed. For example, a downgrade timestamp may be used to ensure that a customer user is not tier downgraded immediately after being upgraded. Generally customer users may get to keep an earned loyalty tier for a minimum amount of time even if their loyalty points are not appropriate to maintain the current tier.

In block 440, the loyalty tier downgrade point boundary for the customer user 150 may be compared with their current loyalty point count such as that determined in block 415. This comparison may take place at the mobile device 155. The pending downgrade tier may be used to let tier downgrades be applied on the client side at the mobile device 155. A customer user 150 may have their loyalty tier downgraded when their loyalty points fall beneath the point requirement for a tier. A downgrade may also occur due to loyalty points expiring or the required number of points for the tier being increased.

In block 445, the customer user's loyalty tier 210 may be downgraded in real-time at the mobile device 155 appropriate. A client module or client software executing at the mobile device 155 may perform the tier downgrade in real-time, or in near real-time without first looping back to the loyalty server 110 based upon the pending downgrade tier previously supplied by the loyalty server 110. The tier downgrade may be considered appropriate if the point boundary discussed in block 440 is exceeded and conditions associated with the downgrade time discussed in block 435 are met.

In block 450, the customer user 150 may be signaled of a potential pending tier downgrade. This signaling may occur on the mobile device 155. When it is determined that a tier downgrade is due for the customer user 150, the pending downgrade tier may be set along with the timestamp indicating when the downgrade should be applied. The client module at the mobile device 155 may then consider the pending downgrade tier when determining which loyalty tier to display for the customer user 150. If the customer user 150 has a downgrade tier set and the associated timestamp has been exceeded, then the pending downgrade tier will be used as the customer user's loyalty tier instead of the current loyalty tier.

In block 455, point modifications and associated loyalty tier status updates may be relayed to the loyalty server 110 from the mobile device 155. The loyalty tier status updates may have already been applied in real-time (or near real-time) at the mobile device 155 without involving the loyalty server 110. Handing the changing in loyalty tiers at the mobile device 155 or on the client-side within the client-side modules can reduce pipeline or communication latency in transacting with the loyalty server 110. After the real-time tier upgrade is complete at the client-side, the upgraded or downgraded tier 210 can be replayed to the loyalty server 110 for data integrity synchronization and future accesses. If a tier upgrade was carried out, the pending upgrade may be removed. Similarly, if a tier downgrade was carried out, the pending downgrade may be removed.

In block 460, real-time access to updated tier features may be supported. Without having to transact with the loyalty server 100 to upgrade or downgrade tiers, the client (mobile device 155) may apply tier upgrades or downgrades and show them to the user immediately. Features of newly updated loyalty tiers may be accessed immediately by the customer user 150 without having to wait for a tier update transaction to occur with the loyalty server 110.

After block 460, the method 400 ends. Of course, loyalty tier management may continue to be carried out between the client-side at the mobile device 155 and the sever-side at the loyalty server 110 according to the methods discussed herein.

General

Users may, in appropriate circumstances, limit or otherwise affect the operation of the features disclosed in the specification. For example, users may be given an initial opportunity to opt-in or opt-out of the collection or use of certain data or the activation of certain features. In addition, a user may change the manner in which the features are employed, including for situations in which a user may have concerns regarding his privacy. Instructions may be provided to notify the users regarding policies about the use of information, including personally identifiable information and receipt information, and manners in which the users may affect such use of information.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary systems, methods, and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for reducing a latency of loyalty tier updates by updating a current loyalty tier to a pending loyalty tier on a mobile computing device, the computer-implemented method comprising:
    receiving, by a mobile computing device, a user loyalty status from a server computing device; wherein the user loyalty status comprises a current tier associated with a user and a loyalty point boundary, the current tier comprising a user loyalty point count, and the loyalty point boundary defining an additional number of user loyalty points to qualify for a pending tier;
    in response to performance of a loyalty activity, updating, by the mobile computing device, the user loyalty point count by adding user loyalty points associated with the loyalty activity to the user loyalty point count;
    in response to the updated user loyalty point count exceeding the loyalty point boundary, updating, by the mobile computing device, the user loyalty status to indicate that the current tier associated with the user is upgraded to the pending tier, wherein the updating the user loyalty status is performed by a client module executed at the mobile computing device without communicating with the server computing device; and
    relaying, by the mobile computing device; to the server computing device, that the current tier associated with the user has been upgraded to the pending tier.

2. The computer-implemented method of claim 1, wherein the pending tier comprises an upgrade tier or a downgrade tier.

3. The computer-implemented method of claim 1, wherein the loyalty activity comprises a check-in at a merchant location.

4. The computer-implemented method of claim 1, further comprising:
    updating, by the mobile computing device, the user loyalty point count with a loyalty point boundary associated with the pending tier, wherein comparing the updated user loyalty point count further comprises evaluating a timestamp associated with the pending tier.

5. The computer-implemented method of claim 1, wherein the updating, by the mobile computing device, the current tier to the pending tier comprises bypassing transacting a tier update with the server computing device.

6. The computer-implemented method of claim 1, further comprising:
    signaling, by the mobile computing device, a potential pending tier downgrade.

7. The computer-implemented method of claim 1, wherein the updating, by the mobile computing device, the user loyalty status comprises allowing features associated with the pending tier to be accessible to the user.

8. A non-transitory computer-readable storage medium having computer-executable program instructions embodied thereon that when executed by a computer cause the computer to reduce a latency of loyalty tier updates by updating a current tier to a pending tier on a mobile computing device, the computer-executable program instructions comprising:
    receiving a user loyalty status from a server computing device, wherein the user loyalty status comprises a current tier associated with a user and a loyalty point boundary, the current tier comprising a user loyalty point count, and the loyalty point boundary defining an additional number of user loyalty points to quality for a pending tier;
    in response to performance of a loyalty activity, updating the user loyalty point count by adding user loyalty points associated with the loyalty activity to the user loyalty point count;
    in response to the updated user loyalty point count exceeding the loyalty point boundary, updating the user loyalty status to indicate that the current tier associated with the user is upgraded to the pending tier, wherein the updating the user loyalty status is performed by a client module executed at the mobile computing device without communicating with the server computing device; and
    relaying to the server computing device that the current tier associated with the user has been upgraded to the pending tier.

9. The non-transitory computer-readable medium of claim 8, wherein the pending tier comprises an upgrade tier or a downgrade tier.

10. The non-transitory computer-readable medium of claim 8, wherein the loyalty activity comprises a check-in at a merchant location.

11. The non-transitory computer-readable medium of claim 8, wherein the computer-executable program instructions further comprise:
    updating the user loyalty point count with a loyalty point boundary associated with the pending tier; and,
    comparing the updated user loyalty point count further by evaluating a timestamp associated with the pending tier.

12. The non-transitory computer-readable medium of claim 8, wherein updating the current tier comprises bypassing transacting a tier update with the server computing device.

13. The non-transitory computer-readable medium of claim 8, further comprising signaling a potential pending tier downgrade at a mobile computing device that is remote from the server computing device.

14. The non-transitory computer-readable medium of claim 8, wherein the updating the user loyalty status comprises allowing features associated with the pending tier to be accessible to the user.

15. A system for reducing a latency associated with loyalty tier updates by updating a currently loyalty tier to a pending loyalty tier in real time on a mobile user computing device, the system comprising:
    a server computing device; and
    a mobile computing device comprising computer executable programs configured to:

receive a user loyalty status from the server computing device, wherein the user loyalty status comprises a current tier associated with a user and a loyalty point boundary, the current tier comprising a user loyalty point count, and the loyalty point boundary defining an additional number of user loyalty points to qualify for a pending tier;

in response to performance of a loyalty activity, update the user loyalty point count by adding user loyalty points associated with the loyalty activity to the user loyalty point count;

in response to the updated user loyalty point count exceeding the loyalty point boundary, update, the user loyalty status to indicate that the current tier associated with the user is upgraded to the pending tier, wherein the updating the user loyalty status is performed by a client module executed at the mobile computing device without communicating with the server computing device; and relaying to the server computing device that the current tier associated with the user has been upgraded to the pending tier.

16. The system of claim 15, wherein the pending tier comprises an upgrade tier or a downgrade tier.

17. The system of claim 15, wherein the loyalty activity comprises a check-in at a merchant location.

18. The system of claim 15, further comprising:
updating the user loyalty point count with a loyalty point boundary associated with the pending tier, wherein comparing the updated user loyalty point count further comprises evaluating a timestamp associated with the pending tier.

19. The system of claim 15, wherein updating the current tier comprises bypassing transacting a tier update with the server computing device.

20. The system of claim 15, wherein the updating the user loyalty status comprises allowing features associated with the pending tier to be accessible to the user.

* * * * *